(12) United States Patent
Krause (10) Patent No.: US 12,315,395 B2
(45) Date of Patent: May 27, 2025

(54) VEHICLE SIMULATOR

(71) Applicant: KLK Motorsport GmbH, Waiblingen (DE)

(72) Inventor: Kaspar Krause, Feldkirchen-Westerham (DE)

(73) Assignee: KLK Motorsport GmbH, Waiblingen (DE)

( * ) Notice: Subject to any disclaimer, the term of this patent is extended or adjusted under 35 U.S.C. 154(b) by 812 days.

(21) Appl. No.: 17/527,738

(22) Filed: Nov. 16, 2021

(65) Prior Publication Data

US 2022/0157190 A1    May 19, 2022

(30) Foreign Application Priority Data

Nov. 18, 2020  (DE) ............. 102020130510.9

(51) Int. Cl.
*G09B 9/04* (2006.01)
*A63G 31/14* (2006.01)
*A63G 31/16* (2006.01)

(52) U.S. Cl.
CPC ............... *G09B 9/04* (2013.01); *A63G 31/14* (2013.01); *A63G 31/16* (2013.01)

(58) Field of Classification Search
CPC ............. G09B 9/02; G09B 9/04; G09B 9/058
See application file for complete search history.

(56) References Cited

U.S. PATENT DOCUMENTS

| | | | | |
|---|---|---|---|---|
| 5,853,330 A | * | 12/1998 | Engstrand ................ | G09B 9/02 472/60 |
| 5,997,303 A | * | 12/1999 | Yoshida .................... | G09B 9/04 472/16 |
| 6,234,800 B1 | * | 5/2001 | Koyama ............... | A63B 26/003 434/61 |
| 9,396,667 B1 | * | 7/2016 | Bober .................... | G09B 9/058 |
| 9,792,830 B2 | * | 10/2017 | Lin .......................... | G09B 9/04 |
| 10,878,714 B2 | * | 12/2020 | Liberatore .............. | G09B 9/14 |

(Continued)

FOREIGN PATENT DOCUMENTS

WO    2011064560 A1    6/2011

OTHER PUBLICATIONS

"How It's Made—Racing Simulators", CXS Simulations, Los Angeles, CA. In: YouTube[online], Auszüge (Screenshots 2:47, 2:57, 4:54, 5:01 min), Oct. 28, 2014, URL: https://youtu.be/PqUMngEtbY.

*Primary Examiner* — Kurt Fernstrom
(74) *Attorney, Agent, or Firm* — Murphy, Bilak & Homiller, PLLC (57) ABSTRACT

An embodiment of a vehicle simulator includes a base support, a movable integral support, and a plurality of actuators. Each actuator is disposed between the base support and the movable integral support and is arranged to cause movement of the movable integral support relative to the base support. The vehicle simulator further includes a seat device rigidly connected to the movable integral support. The vehicle simulator further includes a first actuator arranged to cause a first force on the movable integral support in a transverse direction at a first position. The vehicle simulator further includes a second actuator arranged to apply a second force to the movable integral support in the transverse direction at a second position, the first position and the second position being spaced apart along a longitudinal direction.

17 Claims, 4 Drawing Sheets

(56) References Cited

U.S. PATENT DOCUMENTS

| | | | |
|---|---|---|---|
| 11,263,917 B2* | 3/2022 | Sawade | G09B 9/05 |
| 2002/0032553 A1* | 3/2002 | Simpson | A63F 13/25 |
| | | | 703/8 |
| 2005/0121952 A1* | 6/2005 | Hajduczyk | B62J 1/002 |
| | | | 297/195.1 |
| 2007/0111170 A1* | 5/2007 | Lefton | G09B 9/04 |
| | | | 434/29 |
| 2007/0262628 A1* | 11/2007 | Perigny | A63F 13/28 |
| | | | 297/284.4 |
| 2009/0163283 A1 | 6/2009 | Childress | |
| 2014/0093861 A1* | 4/2014 | Scolari | G09B 9/04 |
| | | | 434/373 |
| 2018/0075769 A1* | 3/2018 | Mar | G09B 9/04 |
| 2020/0035114 A1* | 1/2020 | Koga | A47C 1/00 |
| 2020/0242959 A1 | 7/2020 | Gonzalez Martin | |
| 2021/0110730 A1* | 4/2021 | Harrison | B60R 16/0233 |
| 2021/0166576 A1* | 6/2021 | Berghold-Markom | G09B 9/08 |
| 2022/0176257 A1* | 6/2022 | Smit | A63F 13/245 |
| 2022/0254269 A1* | 8/2022 | Kirkman | G09B 9/12 |

* cited by examiner

VEHICLE SIMULATOR

TECHNICAL FIELD

The present invention relates to a vehicle simulator such as a simulator for a racing vehicle.

BACKGROUND

Vehicle simulators can be used to realistically simulate the operation of a wide variety of vehicles. The vehicles can be road vehicles as well as aircraft or watercraft. Vehicle simulators are widely used to simulate the operation of aircraft, helicopters or road vehicles such as racing vehicles. In the field of racing, racing vehicle simulators can be used to test new developments at low cost or to practice known race tracks in the run-up to a race independently and in addition to actual training sessions. Similarly, racing simulators provide access to racing for a broad public, whereby the vehicle simulator both enables a realistic driving experience through various types of force exerted on the driver while driving and also offers the driver the opportunity to compete with known racing drivers or with fellow players on the basis of real track topographies.

For the driving experience, a high-resolution and realistic reproduction and transfer of the six degrees of freedom of movement of the simulated vehicle to the driver is important.

It is desirable to improve the driving experience of a vehicle simulator.

SUMMARY

An embodiment of the present disclosure relates to a vehicle simulator. The vehicle simulator comprises a base support. The vehicle simulator further comprises a movable integral support. The vehicle simulator further comprises a plurality of actuators, each disposed between the base support and the movable integral support and arranged to cause movement of the movable integral support relative to the base support. The vehicle simulator further comprises a seating device rigidly connected to the movable integral support. The vehicle simulator further comprises a gravity compensation device disposed between the base support and the movable integral support, the gravity compensation device comprising a lever member, a coupling rod and an actuator.

Another embodiment of the present disclosure relates to a further vehicle simulator. The vehicle simulator comprises a base support. The vehicle simulator further comprises a movable integral support. The vehicle simulator further comprises a plurality of actuators, each disposed between the base support and the movable integral support and arranged to cause movement of the movable integral support relative to the base support. The vehicle simulator further comprises a seating device rigidly connected to the movable integral support. The vehicle simulator further comprises a first actuator arranged to cause a first force on the movable integral support in a transverse direction at a first position. The vehicle simulator further comprises a second actuator arranged to apply a second force to the movable integral support in the transverse direction at a second position, the first position and the second position being spaced apart along a longitudinal direction.

Another embodiment of the present disclosure relates to a further vehicle simulator. The vehicle simulator comprises a base support. The vehicle simulator further comprises a movable integral support. The vehicle simulator further comprises a plurality of actuators, each disposed between the base support and the movable integral support and arranged to cause movement of the movable integral support relative to the base support. The vehicle simulator further comprises a seat device that is rigidly connected to the movable integral support. The movable integral support comprises an outer shell made of a fiber-reinforced plastic.

BRIEF DESCRIPTION OF THE DRAWINGS

The accompanying figures illustrate examples of embodiments. The figures are exemplary with respect to the structural elements shown, and structural elements in one figure may be combined with structural elements in another figure.

DETAILED DESCRIPTION

In the following detailed description, reference is made to the accompanying drawings in which specific embodiments are shown. The drawings are not to scale and are for illustrative purposes only. For example, only portions of structural elements may be shown in the figures and/or other elements may in turn be omitted in order to describe a mode of operation based on the portion shown. Corresponding elements are designated by the same reference signs in the various drawings, unless otherwise stated.

The terms "have", "contain", "include", "comprise" and similar terms are open terms and the terms indicate the presence of the identified structures, elements or features but do not exclude the presence of additional elements or features. The indefinite articles and definite articles are intended to include both the plural and the singular unless the context clearly indicates otherwise.

An embodiment relates to a vehicle simulator. The vehicle simulator may comprise a base support. The base support may, for example, be in the form of a frame. The base support may, for example, be attachable to solid ground, e.g. a solid ground such as a floor of a building or the floor of an open space, for example by means of locking means and/or screws. The base support may also comprise means for transport, e.g. rollers and/or transport rings/hooks.

The vehicle simulator may further comprise a movable integral support. A plurality of functional elements of the vehicle simulator may be integrated, e.g. rigidly connected, to the movable integral support. A rigid connection between multiple functional elements via the movable integral support enables, for example, a realistic interaction of the driver with the vehicle.

The vehicle simulator may further comprise a plurality of actuators, each arranged between the base support and the movable integral support and arranged to cause movement of the movable integral support relative to the base support. The plurality of actuators enables, for example, a realistic and comprehensive transmission of the forces acting on a driver in a vehicle. In this regard, the plurality of actuators can cause movements along the six degrees of freedom. For example, forward and backward movements along a longitudinal direction of the movable integral support can simulate the driving experience during acceleration processes and braking processes/crashes. Left and right movements along the transverse direction may, for example, simulate the driving experience during cornering due to centrifugal forces acting. Up and down movements along the height direction can, for example, simulate the driving experience when driving over obstacles. By means of the plurality of actuators, the driving experience during rotational movements can also be simulated, for example, tilting from side to side around the longitudinal axis (rolling), tilting back and forth around the transverse axis (pitching), and left and right rotation around the vertical axis (yawing). The plurality of actuators may be, for example, vertical actuators and horizontal actuators, e.g. three vertical actuators and three horizontal actuators. The plurality of actuators may be, for example, pneumatic actuators and/or hydraulic actuators and/or electromechanical actuators.

The vehicle simulator may further include a seat device that is rigidly connected to the movable integral support.

The vehicle simulator may further comprise a gravity compensation device disposed between the base support and the movable integral support, the gravity compensation device comprising a lever element, a coupling rod and an active device. The gravity compensation device enhances the driving experience of a vehicle simulator by contributing to the high-resolution and realistic reproduction and transmission of the six degrees of freedom of movement of the simulated vehicle to the driver. Without the gravity compensation device, when the movable integral support with rigidly connected functional elements is raised, the weight force thereof plus the weight force of the driver acts as a resistance, and when it is lowered, the weight force of the movable integral support with the rigidly connected functional elements plus the weight force of the driver acts as a driving force, so that the response speed of the movable integral support using actuators is very different. However, by providing the gravity compensation device, only the inertia of the movable integral support with rigidly connected functional elements plus the inertia of the driver during raising as well as lowering has to be overcome. The gravity compensation device is adapted to act against the weight force of the movable integral support, the movable integral support being movable along the vertical direction.

The design of the gravity compensation device with the lever element, the coupling rod and the active device also enables a compact design through the use of fewer components and also contributes to an improvement in the driving experience through high-resolution and realistic reproduction and transmission of the six degrees of freedom of movement of the simulated vehicle to the driver, since a constant or approximately constant force effect and thus gravitational compensation can be achieved via the lever ratios.

For example, the gravity compensation device may comprise only a single lever element. For example, the lever element may be an angle lever element. Flexibility in the arrangement of the components of the gravity compensation device may be achieved, for example, by the fact that a first lever arm of the angle lever element and a second lever arm of the angle lever element may or may not be spaced apart along an axis of rotation of the angle lever element. Precise compensation of weight forces may be achieved via the lever arm ratios. For example, the active device may comprise at least one of a spring element and a damper element.

For example, the active device may comprise one or more parallel acting spring elements, or may comprise one or more parallel acting damper elements, or may comprise one or more parallel acting spring elements in combination with one or more parallel acting damper elements. For example, a spring length of one or more spring elements in the relaxed state may be in a range from 150 mm to 350 mm. For example, a spring length of one or more spring elements in the extended state may be in a range from 300 mm to 600 mm. The specified spring length ranges allow, for example, for a constant or nearly constant force effect when the seat position of the driver is shifted vertically.

For example, one end of the coupling rod may be pivotally connected to the movable integral support. In the unloaded state of the movable integral support, i.e. without a driver, the coupling rod may for example be aligned parallel to the height direction. For example, a connection position of the coupling rod to the movable integral support may be aligned along the longitudinal and transverse directions with respect to a center of mass of the movable integral support. For example, the connection position along the transverse direction coincides with the center of mass along the transverse direction in the unloaded state of the movable integral support, i.e., without a driver. Further, the connection position along the longitudinal direction may differ from the center of mass along the longitudinal direction in the unloaded state of the movable integral support, i.e. without a driver, for example may be longitudinally offset towards the rear, i.e. towards the rear or back side. An offset along the longitudinal direction may be, for example, 50 mm to 150 mm. Such a positioning of the connection position may take into account a displacement of the center of mass along the longitudinal direction in the loaded state of the movable integral support, i.e. with driver. A displacement of the connection position along the longitudinal direction may be motivated, for example, by the fact that a center of mass of the unloaded movable integral support is located further forward than a center of mass of a driver placed in the seat device due to components, e.g. a pedal device, positioned comparatively far forward in the longitudinal direction.

Another embodiment example relates to a further vehicle simulator. As described in connection with the above embodiment example, the vehicle simulator may comprise the base support, the movable integral support, the plurality of actuators and the seating device.

An improvement of the driving experience by high-resolution and realistic reproduction and transmission of the six degrees of freedom of movement of the simulated vehicle to the driver can be achieved, alternatively or also in addition to the gravity compensation device described above, by the plurality of actuators comprising a first actuator which is arranged to cause a first force on the movable integral support in a transverse direction at a first position, and a second actuator arranged to cause a second force on the movable integral support in the transverse direction at a second position, the first position and the second position being spaced apart along a longitudinal direction. Each or some of the plurality of actuators, e.g. the first actuator and/or the second actuator, may directly act on the movable integral support, e.g. without any intervening or coupling elements, e.g. rods, between the actuator and the movable integral support. The plurality of actuators may include horizontal and vertical actuators, for example.

For example, the vehicle simulator may comprise a control device arranged to variably adjust, by means of the first actuator and by means of the second actuator, a yaw axis of the movable integral support along the longitudinal direction.

The first actuator and the second actuator thus provide a realistic driving experience when the vehicle is oversteering or understeering, thereby enhancing the driving experience with the vehicle simulator.

An improvement of the driving experience by high-resolution and realistic reproduction and transmission of the six degrees of freedom of movement of the simulated vehicle to the driver can be achieved alternatively or also in addition to the gravity compensation device described above and/or the first and second actuator by the movable integral support comprising an outer shell made of a fiber-reinforced plastic. This reduces the moving mass and enables an increase in the dynamics of the moving system. The outer shell may extend from a foot area to a back area of a driver. The fiber reinforced plastic may be, for example, a carbon fiber reinforced plastic (CFRP) and/or a glass fiber reinforced plastic (GFRP). The interior of the integral support may be hollow, for example, or may be completely or partially filled or lined with a lightweight material such as a foam. For example, the outer shell may have a base wall thickness and may have a plurality of regions each having a thickness greater than the base wall thickness and connected to one of the plurality of actuators. For example, the increase in thickness may be a function of the maximum forces transmitted to the movable integral support during operation of the respective region. Also, the plurality of regions having an increased thickness may include regions where functional elements of the vehicle, such as a steering device or a pedal device, are rigidly connected.

For example, the seat device may be bonded to the movable integral support. Also, the seat device may be formed of a fiber reinforced plastic, for example carbon fiber reinforced plastic (CFRP) and/or glass fiber reinforced plastic (GFRP).

The vehicle simulator may further comprise, for example, a waist belt, a shoulder belt and a belt tightening device. The shoulder belt and the waist belt may be, for example, a 4-point belt. The belt tightening device is arranged to tighten the waist belt and the shoulder belt. For example, the belt tightening device may be rigidly connected to the movable integral support. Also, for example, the belt tightening device may comprise a single drive element to effect a joint tightening of the waist belt and the shoulder belt.

The features of the examples described above may be combined. In the following, embodiments are described with reference to exemplary figures. Details of depicted features given in connection with the above examples are equally applicable to the depicted features. For example, some features may be shown in a simplified manner, but there may be formed according to the above examples.

Figure 1:
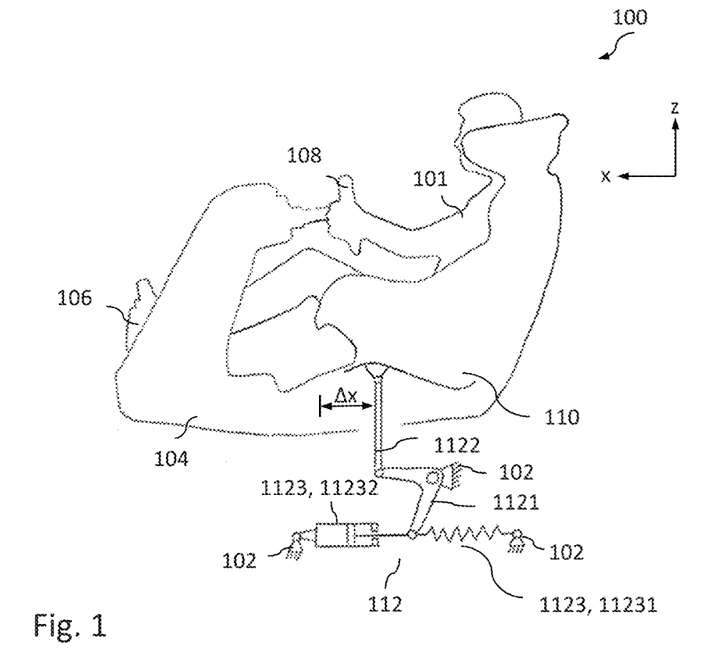
FIG. 1 illustrates a schematic diagram of an embodiment of a vehicle simulator with a gravity compensation device.

FIG. 1 shows a schematic view of a vehicle simulator 100 according to an example embodiment. For illustrative purposes, a person 101 placed in the simulator is shown in addition to the vehicle simulator 100.

The vehicle simulator comprises a base support 102. The base support 102 is shown in simplified form in FIG. 1 for clarity and may be configured as described in connection with the above examples.

Figure 3A:
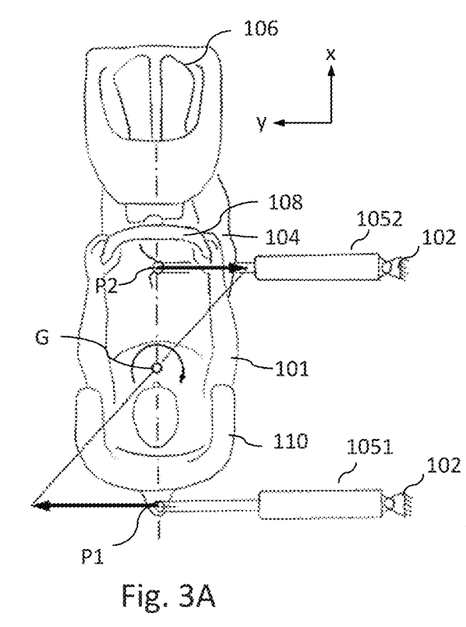
FIGS. 3A to 3C are illustrations of a vehicle simulator having first and second actuators for variably adjusting a yaw axis along a longitudinal direction.
Figure 3B:
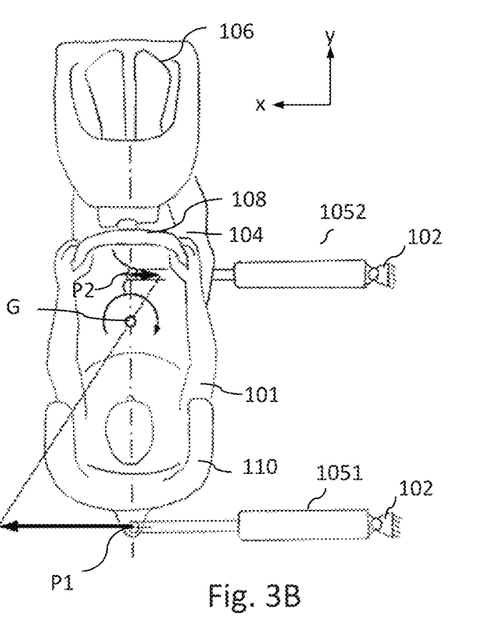
Figure 3C:
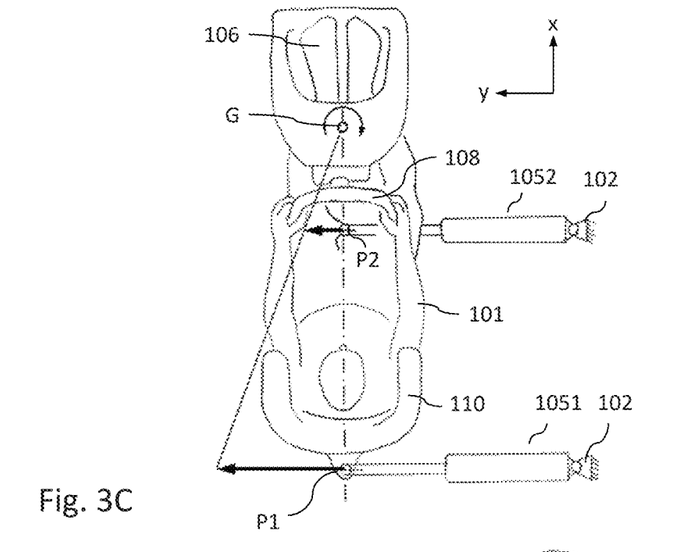

Also, the vehicle simulator 100 comprises a movable integral support 104. The movable integral support is moved relative to the base support 102 by means of a plurality of actuators. The plurality of actuators is not shown in the schematic view of FIG. 1 for clarity. The embodiments of FIGS. 3A to 3C show exemplary actuators.

The vehicle simulator comprises a seat device 110 which is rigidly connected to the movable integral support 104, e.g. glued to the movable integral support 104.

The vehicle simulator 100 includes a gravity compensation device 112 disposed between the base support 102 and the movable integral support 104. The gravity compensation device 112 comprises a lever element 1121, a coupling rod 1122 and an acting device 1123. The acting device 1123 of the embodiment in FIG. 1 comprises a spring element 11231 and a parallel-acting damper element 11232. The coupling rod 1122 is formed as an angle lever element. An end of the coupling rod 1122 is pivotally connected to the movable integral support 104. A connection position in the longitudinal direction x is aligned with a center of mass of the movable integral support 104. The connection position deviates along the longitudinal direction x from the center of mass of the movable integral support 1104 in the unloaded state, i.e., without a driver, and may be offset, for example rearwardly in the longitudinal direction, i.e., toward the rear or back side. An offset Δx along the longitudinal direction x may be, for example, 50 mm to 150 mm.

The vehicle simulator 100 also includes a pedal device 106 and a steering device 108, each of which is rigidly connected to the movable integral support 104.

The gravity compensation device 112 may also be formed as shown in any of the embodiments shown in FIGS. 2A through 2D.

Figure 2A:
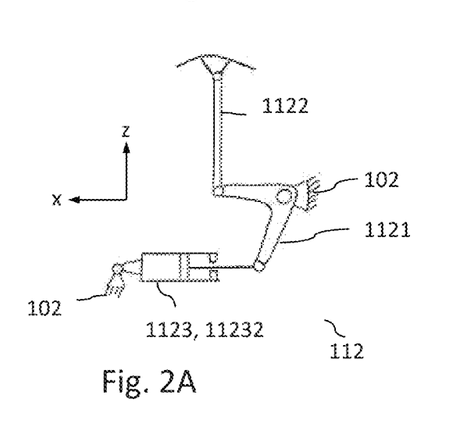
FIGS. 2A to 2D illustrate embodiments of a gravity compensation device for a vehicle simulator.
Figure 2B:
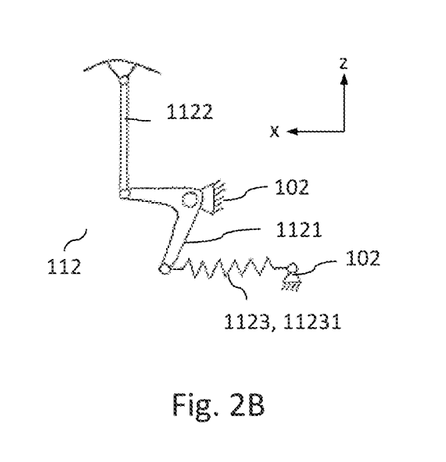
Figure 2C:
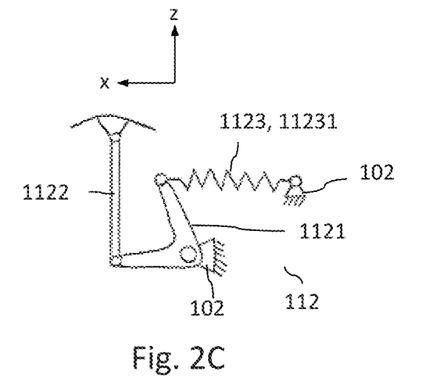
Figure 2D:
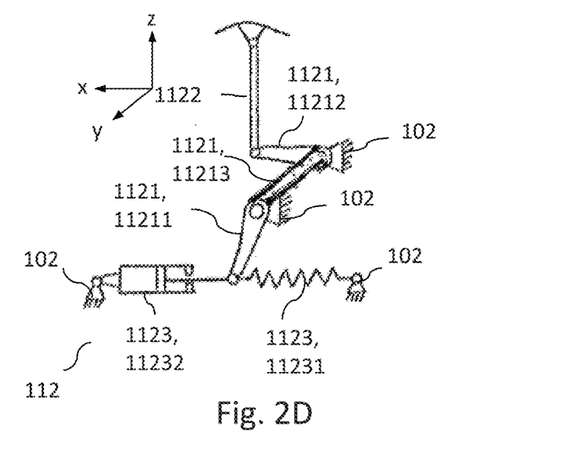

For example, the gravity compensation device 112 may comprise the damper element 11232 (cf. FIG. 2A) or the spring element 11231 (cf. FIG. 2B). Also, the positioning of the spring element 11232 (or, in an analogous manner, the damper element) can be adapted to the design conditions of the vehicle simulator 100 by, for example, positioning the deflection lever 1121 and thus the spring element 11231 differently (cf. FIG. 2C). In the case of the embodiment example shown in FIG. 2D, a first lever arm 11211 of the deflection lever 1121 and a second lever arm 11212 of the deflection lever 1121 are spaced apart from each other along an axis of rotation extending in the transverse direction y, for example by a connecting rod 11213. This allows further flexibility in the arrangement of the gravity compensation device 112 and thus a further improvement in the compact design of the vehicle simulator 100.

The schematic views in FIGS. 3A to 3C show an embodiment of a vehicle simulator 100, wherein the plurality of actuators comprises a first actuator 1051 arranged to cause a first force on the movable integral support 104 in a transverse direction y at a first position P1. The plurality of actuators further comprises a second actuator 1052 arranged to cause a second force on the movable integral support 104 in the transverse direction y at a second position P2, the first position P1 and the second position P2 being spaced apart from each other along the longitudinal direction x. For example, the vehicle simulator may comprise a control device arranged to cause variable adjustment of a yaw axis G of the movable integral support 104 by actuating the first actuator 1051 and the second actuator 1052. The variable adjustment of the yaw axis G along the longitudinal direction x of the vehicle simulator 100 is illustrated in FIGS. 3A to 3C by means of arrows representing the magnitude and direction of the forces transmitted via the actuators 1051, 1052.

Figure 4:
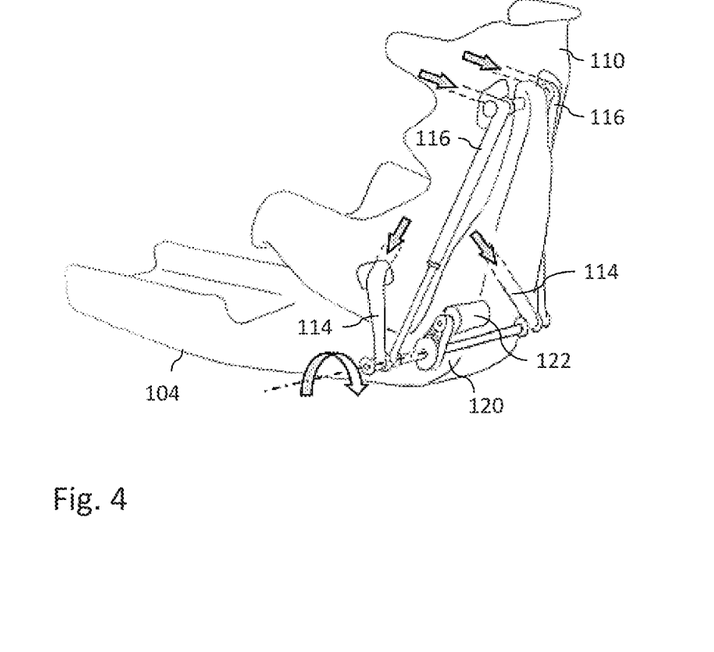
FIG. 4 is a schematic illustration of a seating device with a waist and shoulder belt according to an embodiment.

Referring to the schematic diagram of FIG. 4, an embodiment of the vehicle simulator 100 is shown with the movable integral support 102 and the seat device 110, wherein the vehicle simulator 100 further comprises a waist belt 114, a shoulder belt 116, and a belt tightening device 120. The seat belt tightening device 120 is configured to tighten the hip belt 114 and the shoulder belt 116. In the illustrated embodiment, the belt tightening device 120 is rigidly connected to the movable integral support 104 and includes a drive member 122 to effect a joint tightening of the hip belt 114 and the shoulder belt 116.

Figure 5:
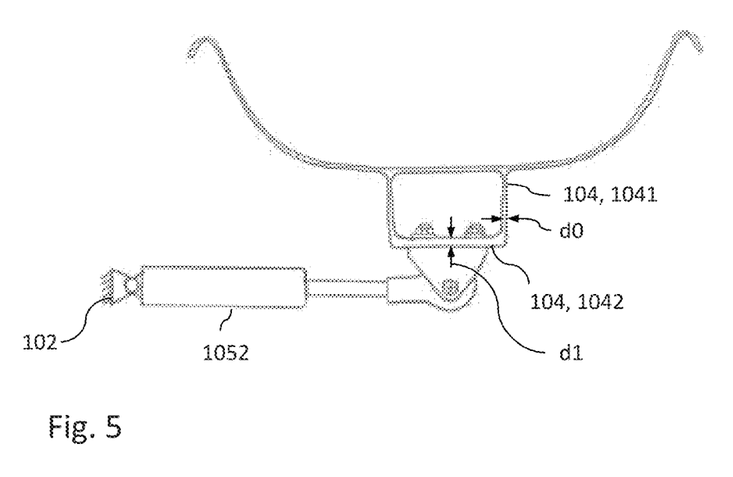
FIG. 5 is a schematic illustration of an exemplary outer shell of a movable integral support.

The schematic cross-sectional view of FIG. 5 illustrates, by way of example, a portion of the movable integral support 104 that includes an outer shell 1041 made of a fiber-reinforced plastic. The outer shell has a base wall thickness d0 and may have a plurality of regions, cf. e.g. a region 1042, each having a thickness, cf. e.g. a thickness d1 in the region 1042, greater than the base wall thickness d0 and connected to one of the plurality of actuators, cf. e.g. the second actuator 1052 in FIG. 5.

Although the present disclosure is not so limited, the following numbered examples demonstrate one or more aspects of the disclosure.

Example 1. A vehicle simulator, comprising: a base support, a movable integral support, a plurality of actuators each disposed between the base support and the movable integral support and arranged to cause movement of the movable integral support relative to the base support, a seat device rigidly connected to the movable integral support, a gravity compensation device arranged between the base support and the movable integral support, the gravity compensation device comprising a lever element, a coupling rod and an active device.

Example 2. A vehicle simulator, comprising: a base support,
a movable integral support, a plurality of actuators each disposed between the base support and the movable integral support and arranged to cause movement of the movable integral support relative to the base support, a seat device rigidly connected to the movable integral support, a first actuator arranged to apply a first force to the movable integral support in a transverse direction at a first position, a second actuator arranged to apply a second force to the movable integral support in the transverse direction at a second position, the first position and the second position being spaced apart along a longitudinal direction.

Example 3. A vehicle simulator, comprising: a base support,
a movable integral support, a plurality of actuators each disposed between the base support and the movable integral support and arranged to cause movement of the movable integral support relative to the base support, a seat device rigidly connected to the movable integral support, and wherein the movable integral support has an outer shell made of a fiber-reinforced plastic.

Example 4. The vehicle simulator of example 1 or 2, wherein the movable integral support comprises an outer shell made of a fiber-reinforced plastic.

Example 5. The vehicle simulator of any of the preceding examples, wherein the outer shell has a base wall thickness and includes a plurality of regions, wherein each of the plurality of regions has a thickness greater than the base wall thickness and is connected to one of the plurality of actuators.

Example 6. The vehicle simulator of example 1 or 4, further comprising: a first actuator arranged to apply a first force to the movable integral support in the transverse direction at a first position, a second actuator arranged to apply a second force to the movable integral support in the transverse direction at a second position, the first position and the second position being spaced apart along the longitudinal direction.

Example 7. The vehicle simulator of example 2 or 6, further comprising: a control device which is arranged to variably adjust a yaw axis of the movable integral carrier along the longitudinal direction by means of the first actuator and by means of the second actuator.

Example 8. The vehicle simulator of example 2 or 3, further comprising: a gravity compensation device arranged between the base support and the movable integral support, the gravity compensation device comprising a lever element, a coupling rod and an active device.

Example 9. The vehicle simulator of example 1 or 8, wherein the active device comprises at least one of a spring element or a damper element.

Example 10. The vehicle simulator of any one of examples 1, 8 or 9, wherein one end of the coupling rod is pivotally connected to the movable integral support, and wherein a connection position in the longitudinal and transverse directions is aligned with a center of mass of the movable integral support.

Example 11. The vehicle simulator of any one of examples 1, 8 to 10, wherein the lever element is an angle lever element.

Example 12. The vehicle simulator of the preceding example, wherein a first lever arm of the angle lever member and a second lever arm of the angle lever member are spaced apart along an axis of rotation of the angle lever member.

Example 13. The vehicle simulator of any one of the preceding examples, wherein the seat device is glued to the movable integral support.

Example 14. The vehicle simulator of any one of the preceding examples, further comprising: a waist belt, a shoulder belt, a belt tightening device arranged to tighten the waist belt and the shoulder belt.

Example 15. The vehicle simulator of the preceding example, wherein the belt tightening device is rigidly connected to the movable integral support.

Example 16. The vehicle simulator of any one of the preceding two examples, wherein the belt tightening device comprises a drive element to effect a joint tightening of the waist and shoulder belts.

Although specific embodiments are illustrated and described herein, it will be understood by those skilled in the art that a variety of alternative and/or equivalent embodiments may be used for the specific embodiments shown and described without departing from the scope of the present disclosure. For example, further embodiments may be based on the embodiments shown or described, with features added or omitted.

The invention claimed is:

1. A vehicle simulator, comprising:
a base support;
a movable integral support;
a plurality of actuators each disposed between the base support and the movable integral support and arranged to cause movement of the movable integral support relative to the base support;
a seat device rigidly connected to the movable integral support;
a first actuator of the plurality of actuators arranged to directly apply a first force to the movable integral support in a transverse direction at a first position; and
a second actuator of the plurality of actuators arranged to directly apply a second force to the movable integral support in the transverse direction at a second position, the first position and the second position being spaced apart along a longitudinal direction, wherein the movable integral support comprises an outer shell made of a fiber-reinforced plastic, wherein the outer shell has a base wall thickness and a plurality of regions each having a thickness greater than the base wall thickness and connected to one of the plurality of actuators.

2. The vehicle simulator of claim 1, wherein the movable integral support extends from a foot area to a back area of a driver.

3. The vehicle simulator of claim 1, further comprising:
a control device arranged to variably adjust a yaw axis of the movable integral support along the longitudinal direction by the first actuator and by the second actuator.

4. The vehicle simulator of claim 1, further comprising:
a gravity compensation device arranged between the base support and the movable integral support,
wherein the gravity compensation device comprises a lever element, a coupling rod, and an active device,
wherein the gravity compensation device is adapted to act against a weight force of the movable integral support,
wherein the movable integral support is movable along a vertical direction.

5. The vehicle simulator of claim 4, wherein the active device comprises at least one of a spring element or a damper element.

6. The vehicle simulator of claim 4, wherein an end of the coupling rod is pivotally connected to the movable integral support, and wherein a connection position in the longitudinal and transverse directions is aligned with a center of mass of the movable integral support.

7. The vehicle simulator of claim 4, wherein the lever element is an angle lever element.

8. The vehicle simulator of claim 7, wherein a first lever arm of the angle lever member and a second lever arm of the angle lever member are spaced apart along an axis of rotation of the angle lever member.

9. The vehicle simulator of claim 1, wherein the seat device is glued to the movable integral support.

10. The vehicle simulator of claim 1, further comprising:
a waist belt;
a shoulder belt; and
a belt tightening device arranged to tighten the waist belt and the shoulder belt.

11. The vehicle simulator of claim 10, wherein the belt tensioning device is rigidly connected to the movable integral support.

12. The vehicle simulator of claim 10, wherein the belt tightening device comprises a drive element to effect a joint tightening of the waist and shoulder belts.

13. A vehicle simulator, comprising:
a base support;
a movable integral support;
a plurality of actuators each disposed between the base support and the movable integral support and arranged to cause movement of the movable integral support relative to the base support;
a seat device rigidly connected to the movable integral support;
a first actuator of the plurality of actuators arranged to directly apply a first force to the movable integral support in a transverse direction at a first position;
a second actuator of the plurality of actuators arranged to directly apply a second force to the movable integral support in the transverse direction at a second position, the first position and the second position being spaced apart along a longitudinal direction; and
a gravity compensation device arranged between the base support and the movable integral support,
wherein the gravity compensation device comprises a lever element, a coupling rod, and an active device,
wherein the gravity compensation device is adapted to act against a weight force of the movable integral support,
wherein the movable integral support is movable along a vertical direction.

14. The vehicle simulator of claim 13, wherein the active device comprises at least one of a spring element or a damper element.

15. The vehicle simulator of claim 13, wherein an end of the coupling rod is pivotally connected to the movable integral support, and wherein a connection position in the longitudinal and transverse directions is aligned with a center of mass of the movable integral support.

16. The vehicle simulator of claim 13, wherein the lever element is an angle lever element.

17. The vehicle simulator of claim 16, wherein a first lever arm of the angle lever member and a second lever arm of the angle lever member are spaced apart along an axis of rotation of the angle lever member.

* * * * *